United States Patent
Zakaria et al.

(10) Patent No.: US 9,839,006 B1
(45) Date of Patent: Dec. 5, 2017

(54) DUAL RADIO ARCHITECTURE FOR AN ELECTRONIC DEVICE OPERABLE IN A WIRELESS LOCAL AREA NETWORK

(71) Applicant: Amazon Technologies, Inc., Reno, NV (US)

(72) Inventors: Omar Zakaria, San Jose, CA (US); Sam Bowen, Cupertino, CA (US); Varada Gopalakrishnan, Cupertino, CA (US); Shih-Chun Chang, San Jose, CA (US); In Chul Hyun, San Jose, CA (US); Subram Narasimhan, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 14/223,811

(22) Filed: Mar. 24, 2014

(51) Int. Cl.
*H04W 72/04* (2009.01)
*H04W 88/06* (2009.01)

(52) U.S. Cl.
CPC .......... *H04W 72/04* (2013.01); *H04W 88/06* (2013.01)

(58) Field of Classification Search
CPC ........ H04B 7/0413; H04B 1/38; H04B 1/006; H04B 7/0689; H04B 7/0871; H04W 84/12; H04W 36/16
See application file for complete search history.

(56) References Cited

U.S. PATENT DOCUMENTS

| | | | |
|---|---|---|---|
| 2010/0316027 A1* | 12/2010 | Rick | H04W 88/06 370/336 |
| 2013/0095883 A1* | 4/2013 | Hirsch et al. | 455/553.1 |
| 2013/0157603 A1* | 6/2013 | Behzad | H04B 1/0057 455/272 |
| 2014/0105198 A1* | 4/2014 | Banerjea | H04W 76/025 370/338 |
| 2015/0036656 A1* | 2/2015 | McCarthy | H04B 7/0871 370/331 |
| 2015/0103663 A1* | 4/2015 | Amini | H04W 28/0215 370/235 |

* cited by examiner

*Primary Examiner* — Redentor Pasia
*Assistant Examiner* — Peter Mak
(74) *Attorney, Agent, or Firm* — Weaver Austin Villeneuve & Sampson LLP

(57) ABSTRACT

An electronic device has a first and second radio, each being compatible with at least two wireless local area network (LAN) standards and one or both being compatible with at least one wireless personal area network (WPAN) standard. The electronic device includes a radio control arrangement that establishes mutually non-interfering communication links between (i) one or both of the first and second radio and (ii) at least two remote devices within a wireless LAN that includes the electronic device and the at least two remote devices. The at least two remote devices include at least one network access point and at least a second electronic device; the mutually non-interfering communication links including a network communication link between the first or second radio and the access point, and a peer-to-peer communication link between the first radio or the second radio and the second electronic device.

20 Claims, 8 Drawing Sheets

DUAL RADIO ARCHITECTURE FOR AN ELECTRONIC DEVICE OPERABLE IN A WIRELESS LOCAL AREA NETWORK

BACKGROUND

A wireless local area network (WLAN) may include a diversity of electronic devices such as smart phones, laptop computers, tablets, digital media players, audio/visual equipment such as televisions and stereos, set-top boxes and remote control devices. Increasingly, such devices are required to be interoperable within the WLAN. For example, a router or other access point connected to the Internet may also be connected wirelessly with any number of such electronic devices within the WLAN. In addition, one or more of the devices within the WLAN may wirelessly communicate directly with another one of the devices in the WLAN, as well as with the access point. For example, a tablet device may have a wireless communication link with the access point. Simultaneously, the tablet device might maintain a separate wireless communication link with a set-top box or a digital media player. This functionality has been provided by time domain multiplexing of a single radio on the tablet between the two communication links. However, this approach substantially reduces the effective data rate that can be accommodated by each link.

DETAILED DESCRIPTION

The presently disclosed techniques relate to an electronic device that is operable within a wireless local area network (LAN). The electronic device includes a dual radio architecture with which the electronic device may simultaneously communicate with different devices within the wireless LAN without suffering performance degradation due to switching. The dual radio architecture enables two or more mutually non-interfering communication links to be established and maintained.

Figure 1:
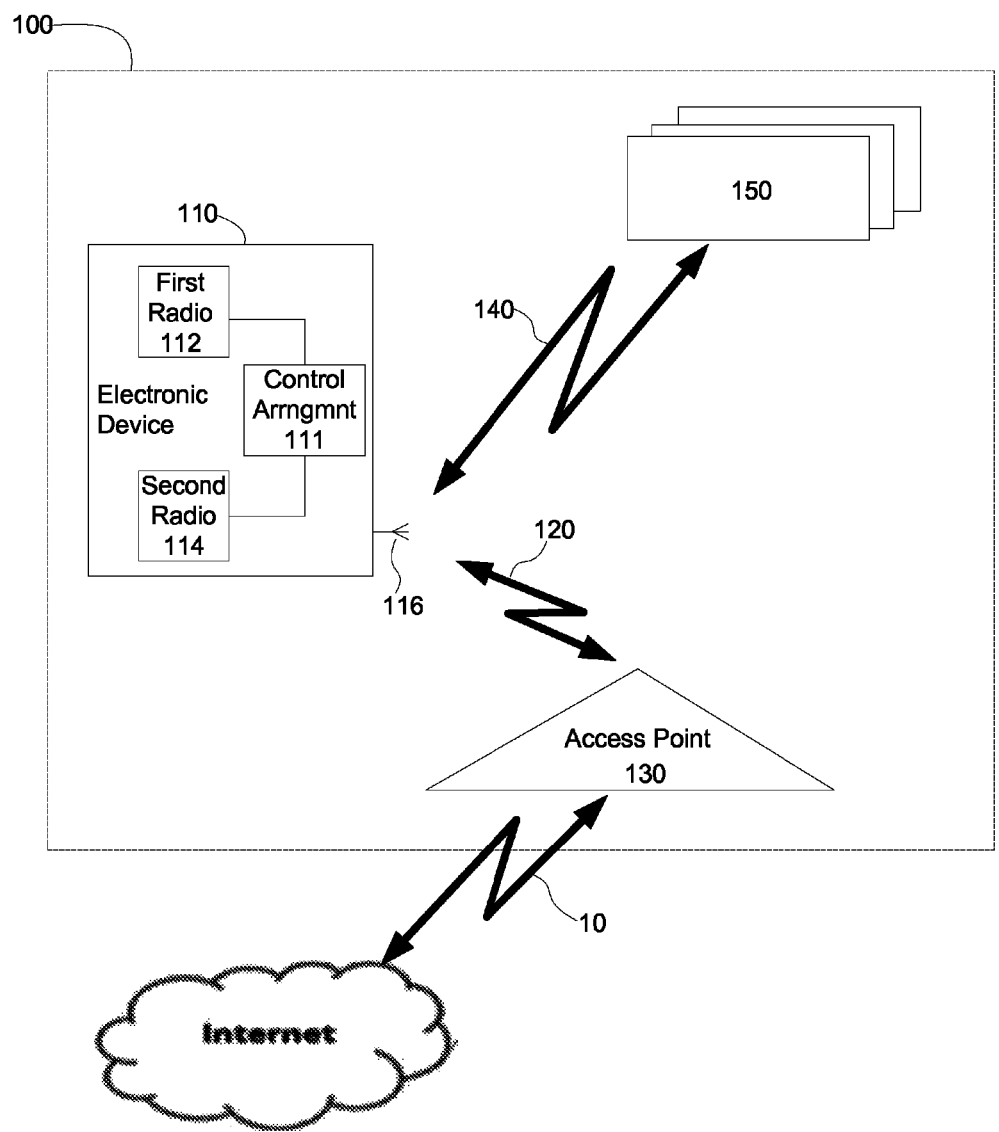
FIG. 1 is a simplified block diagram of a wireless local area network (LAN) including an electronic device configured according to a particular class of implementations.

Devices within the wireless LAN may communicate by way of communication links compliant with one or more wireless LAN or and/or wireless personal area network (WPAN) standards. For example, some or all of the communication links within the wireless LAN may be compliant with one or more variants of the IEEE 802.11 standard (sometimes referred to as "Wi-Fi"), and may operate in the 2.4 GHz or 5 GHz bands. In addition, at least some of the communication links within the wireless LAN may be compliant with one or more PAN standards, such as, for example, the Bluetooth standard, IrDA, Wireless USB, Z-Wave and ZigBee. Referring now to FIG. 1, wireless LAN 100 includes a first electronic device 110, a second electronic device 150 and a network access point 130. It will be appreciated that multiple second electronic devices 150, which may be referred to as peer devices, are within the contemplation of the present disclosure.

As will be described in more detail below, a radio control arrangement 111 enables the first electronic device 110 to configure, for simultaneous operation, a first communication link 120 with the network access point 130, and a second communication link 140 with one or more second electronic devices 150. For convenience of nomenclature, the first communication link 120 may be referred to hereinbelow, and in the claims, as a "network communication link" and the second communication link 140 may be referred to hereinbelow, and in the claims, as a "peer-to-peer communication link".

The network access point 130 may be communicatively coupled with a wide area network, for example the Internet, by way of a high-bandwidth wired, optical, or radio frequency connection 10. The network access point 130, which may be, for example, a wireless router, may be referred to hereinafter, and in the claims, as the "access point". In some implementations, the radio control arrangement 111 may dynamically and automatically establish mutually non-interfering communication links between: (i) the first electronic device 110 and the access point 130; and (ii) the first electronic device 110 and the second electronic device 150.

Each of the first electronic device 110 and the second electronic device 150 may be, for example, any type of mobile electronic device (e.g., an electronic book reader, a tablet computing device, a laptop computer, a smart phone, etc.) or any type of non-mobile electronic device (e.g., a desktop computer, a television, set-top box, stereo, digital media player, etc.). The first device 110 may include a dual radio architecture controlled by the radio control arrangement 111 as described in more detail hereinbelow. In the illustrated implementation, the dual radio architecture includes a first radio 112, a second radio 114 and an antenna 116. It should be noted that other architectures are within the contemplation of the present disclosure, including, for example, implementations having a fewer or greater number of radios and architectures having two or more antennas.

In some implementations, the radio control arrangement 111 may be configured to support simultaneous operation of the first communication link 120 with the access point 130 and the peer-to-peer communication link 140 with the second electronic device 150. As disclosed in more detail hereinbelow, simultaneous operation of the first communication link 120 with the access point 130 and the peer-to-peer communication link 140 may be accomplished without recourse to time domain multiplexing and without regard to whether there is substantial isolation between two or more antennas 116.

Figure 2A:
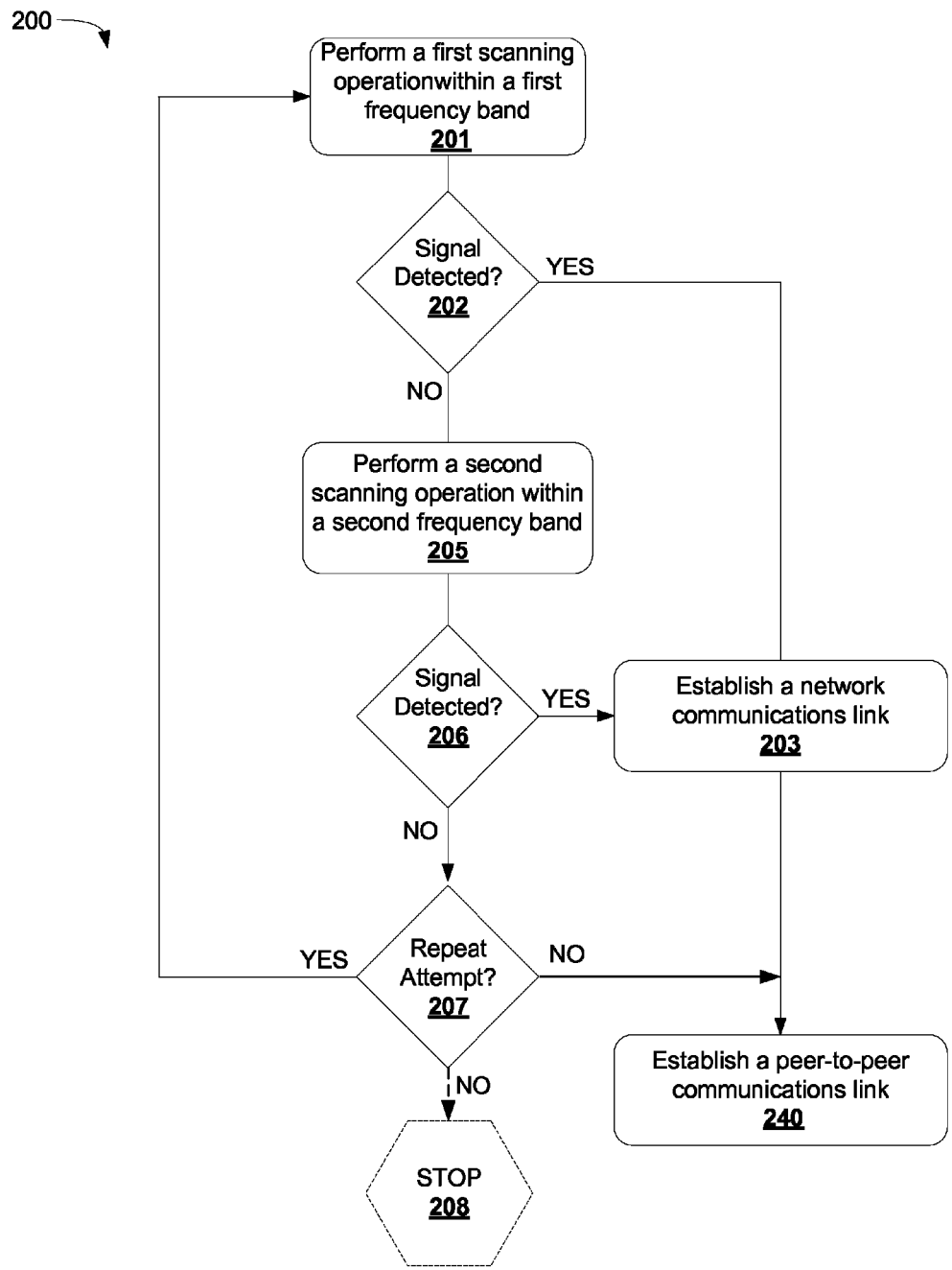
FIGS. 2A and 2B illustrate a simplified process flow diagram of a method for establishing mutually non-interfering communication links electronic device within a wireless (LAN), according to a particular class of implementations.

In some implementations, the radio control arrangement 111 may dynamically and automatically establish respective communication links 120 and 140 by executing a process 200 illustrated in FIG. 2A. At block 201, the radio control arrangement 111 may perform a first scanning operation.

The scanning operation may be performed using the first radio 112, for example, operating within a first frequency band with the objective of detecting a signal from the access point 130. The first frequency band may be selected to be compliant with one or more wireless LAN standards. For example, the first frequency band may be within the 2.4 GHz band or the 5 GHz band specified by one or more of the IEEE 802.11 standards.

At block 202, a determination may be made as to whether a signal from the access point 130 has been detected. When the determination is that a signal from the access point 130 has been detected, the radio control arrangement 111 may proceed to select the first frequency band for the first communication link 120 with the access point 130. The first communication link 120, in this instance, may be established, block 203 within the first frequency band, and the radio control arrangement 111 may proceed, at block 240, to establish the peer-to-peer communication link 140 with the second electronic device 150.

In some implementations, the peer-to-peer communication link 140 may be established at one or both of a different frequency and a different communication standard than the first communication link 120 with the access point 130. For example, if the first communication link 120 is established within the 2.4 GHz band, the peer-to-peer communication link 140 may be established within the 5 GHz band. As a further example, if the first communication link 120 is established within the 5 GHz band, the peer-to-peer communication link 140 may be established within the 2.4 GHz band, in accordance with either one of the IEEE 802.11 standards or a PAN standard such as, for example, the Bluetooth standard.

If the determination at block 202 is that a signal from the access point 130 has not been detected, the radio control arrangement 111 may proceed, at block 205, to perform a second scanning operation. In some implementations, the second scanning operation may be performed within a different frequency band than the first scanning operation. For example, if the first scanning operation is within the 2.4 GHz band, the second scanning operation may be performed within the 5 GHz band.

At block 206, a determination may be made as to whether a signal from the access point 130 has been detected. When the determination is that a signal from the access point 130 has been detected, the radio control arrangement 111 may proceed to select the second frequency band for the first communication link 120 with the access point 130. The first communication link 120, in this instance, may be established, block 203, within the second frequency band, and the radio control arrangement 111 may proceed, at block 240, to establish the peer-to-peer communication link 140 with the second electronic device 150. As indicated above, the peer-to-peer communication link 140 may be established at one or both of a different frequency and a different communication standard than the first communication link 120.

If the determination at block 206 is that a signal from the access point 130 has not been detected, a determination may be made, at block 207, as to whether or not to repeat the process 200. In the event that the determination is to repeat the process 200, the radio control arrangement 111 may return to block 201 and repeat performance of the first scanning operation. In the event the determination is to not repeat the process 200, the peer-to-peer communication link 140 may be established without regard to avoidance of potential interference with a network communications link. Alternatively, the process 200 may stop, block 208.

Figure 2B:
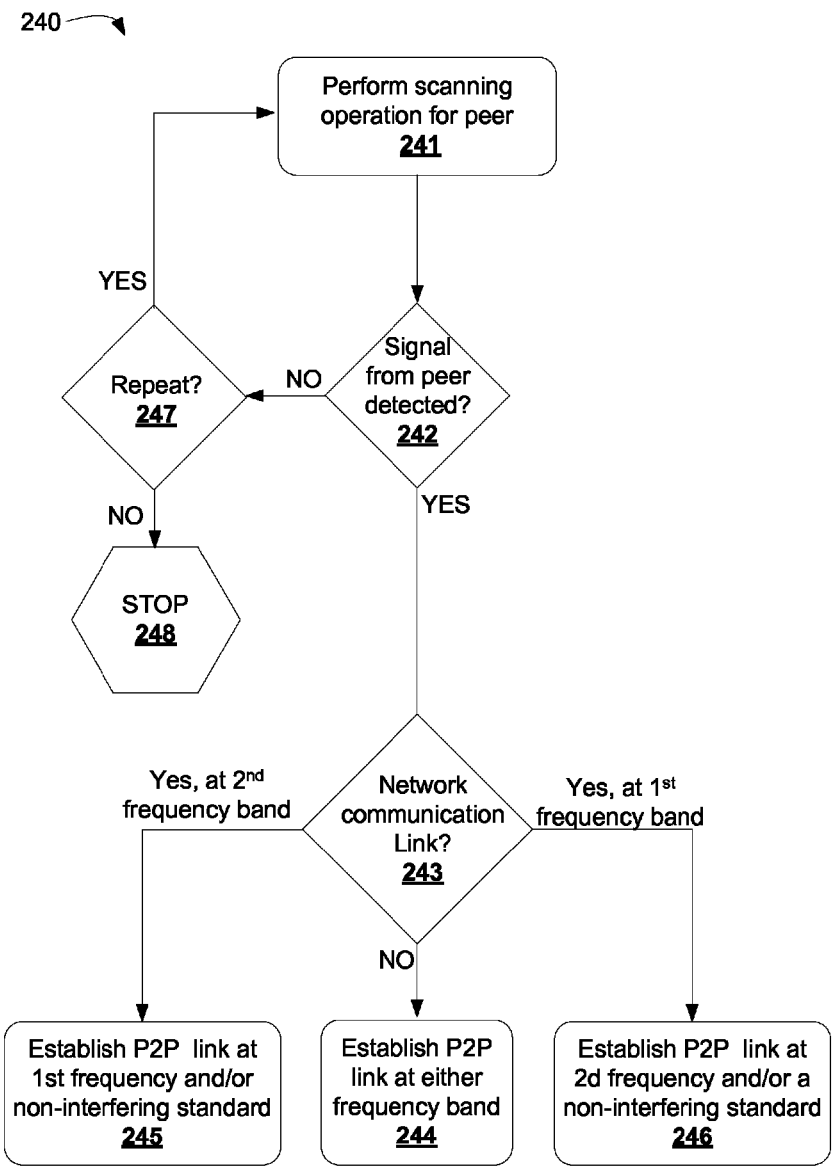

Referring to FIG. 2B, an example of a process signified by block 240 for establishing a peer-to-peer communication link is illustrated. At block 241, the radio control arrangement 111 may, with the objective of detecting a signal from the second electronic device ("peer") 150. At block 242, a determination may be made whether or not a signal from the peer 150 is detected. In the event that a signal from the peer is detected at block 242 a peer-to-peer ("P2P") communication link may be established in the following manner. At block 243, a determination may be made as to whether a network communication link has previously been established. If it is determined that a network communication link has not been established, then the peer-to-peer communication link 140 may be established block 244, without regard to avoidance of potential interference with a network communications link. On the other hand, if it is determined that a network communication link has been established at the first frequency band, then the peer-to-peer communication link 140 may be established, block 246, at the second frequency band and/or using a different communication standard such as, for example, Bluetooth. Finally, if it is determined that a network communication link has been established at the second frequency band, then the peer-to-peer communication link 140 may be established, block 245, at the first frequency band and/or using a different communication standard such as, for example, Bluetooth.

If the determination at block 242 is that a signal from a peer is not detected, a decision may be made, block 247 whether or not to repeat the scan. If the decision at block 247 is to repeat the scan, the process may proceed to block 241. Alternatively, the decision is to not repeat scan, the process may stop, block 248.

Figure 3:
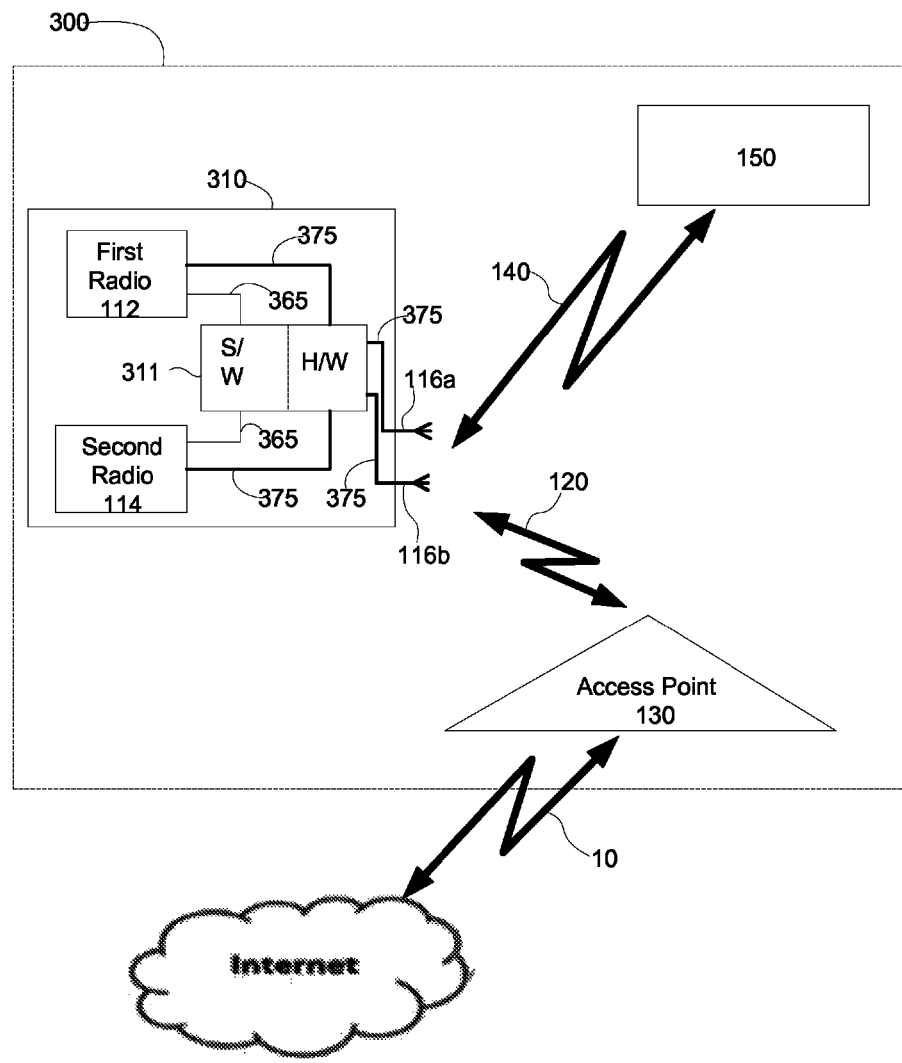
FIG. 3 is a simplified block diagram of a wireless local area network (LAN) including an electronic device configured according to a particular class of implementations

Referring now to FIG. 3, another implementation of the presently disclosed techniques is illustrated. In the illustrated implementation, wireless LAN 300 includes first electronic device 310, the access point 130 and the second electronic device 150. First electronic device 310 may be communicatively coupled with the access point 130 and the second electronic device 150 by way of, respectively, the first communication link 120 and the peer-to-peer communication link 140. In the illustrated implementation, the first electronic device 310 includes exactly two antennas, an antenna 116a and an antenna 116b. In some implementations, a greater number of antennas may be provided. The first radio 112 and the second radio 114 may each be connected to one or both of the antennas 116a and 116b. By way of communication paths 375. The first radio 112 and the second radio 114 may be coupled with a radio control arrangement 311 by way of control signal paths 365.

In the illustrated implementation, the radio control arrangement 311 is depicted as including a software (S/W) module and a hardware (H/W) module. The hardware module may include physical switches that may control, at least in part, the routing of the communication paths 375. The software module of the radio control arrangement 311 may control the switches and other elements of the hardware module. Moreover, the software module of the radio control arrangement 311 may configure the first radio 112 and the second radio 114. For example, the software module of the radio control arrangement 311 may execute the process 200 described hereinabove in connection with FIG. 2.

For convenience of illustration, the radio control arrangement 311 is depicted in FIG. 3 as a single block including the software module and the hardware module. It will be appreciated, however, that elements of the radio control module 311 may be distributed in a variety of ways. For example, the software components may be implemented within existing processor elements of the first electronic device 310. Likewise, switches and other physical components of the hardware module of the radio control arrangement 311 may be distributed among a variety of locations.

In some implementations, each of the first radio 112 and the second radio 114 may be compatible with at least two wireless LAN standards. In addition, one or both of the first radio 112 and the second radio 114 may be compatible with at least one wireless personal area network standard such as, for example, the Bluetooth standard, IrDA, Wireless USB, Z-Wave and ZigBee. The radio control arrangement 311 may establish respective communication links between, on the one hand, one or both of the first radio 112 and the second radio 114, and, on the other hand, the access point 130 and the second electronic device 150. For example, the first radio 112 or the second radio 14 may be communicatively coupled with the access point 130 by the first communications link 120. By way of one or both of the antenna 116a, and the antenna 116b. Similarly, the first radio 112 or the second radio 114 may be communicatively coupled with the second electronic device 150 by the peer-to-peer communications link 140 by way of one or both of the antenna 116a and the antenna 116b.

In some implementations, the radio control arrangement 311 may establish the peer-to-peer communication link 140 at one or both of a different frequency and a different communication standard than the first communication link 120. As a result, the peer-to-peer communication link 140 and the first communication link 120 with the access point 130 may be substantially non-interfering whether or not there is substantial isolation between, for example, the first antenna 116a and the second antenna 116b. Thus, the presently disclosed techniques enable simultaneous operation of multiple communication links over two or more antennas while minimizing the need for spatial isolation or shielding between the antennas.

Figure 4:
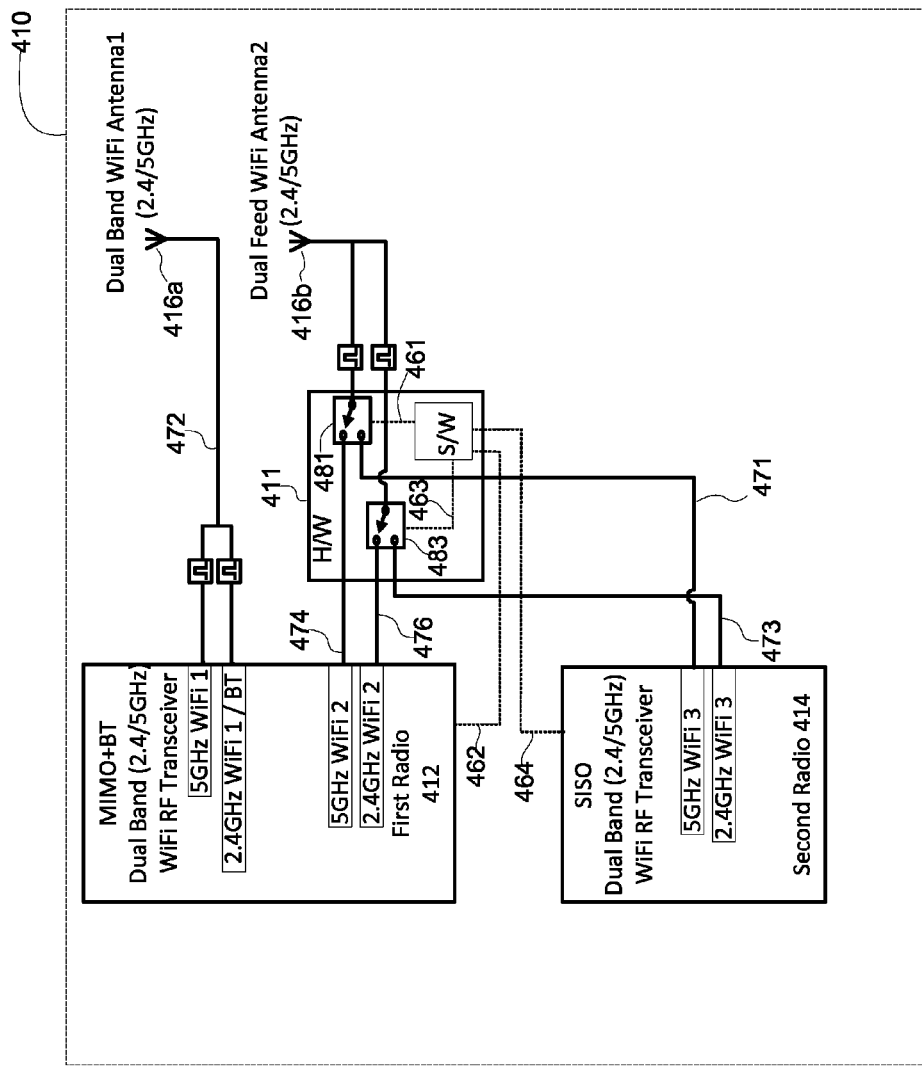
FIG. 4 is a simplified block diagram of an electronic device including a first radio, a second radio and a radio control arrangement according to a particular class of implementations.

A better understanding of the presently disclosed techniques may be obtained by referring next to FIG. 4, which illustrates an example implementation where an electronic device 410 includes a first radio 412 and a second radio 414.

In the illustrated implementation, the first radio 412 is a 2×2 multiple-input and multiple-output, ("MIMO"), dual band Wi-Fi transceiver operable at the 2.4 GHz and 5 GHz bands. The first radio 412 includes dual I/O's, a first I/O being communicatively coupled with a first antenna 416a by way of communication path 472, and a second I/O being communicatively coupled with the radio control arrangement 411 by way of communication paths 474 and 476. The first radio 412 may be operable at frequencies compliant with one or more IEEE 802.11 standards. In the illustrated implementation, for example, the first radio 412 is selectably operable at either the 2.4 GHz or the 5 GHz frequency band. The first radio 412 may also be operable at frequencies compliant with one or more wireless PAN standards. In the illustrated implementation, for example, the first radio 412 may operate in a Bluetooth ("BT") frequency band at about 2.4 GHz.

Referring still to FIG. 4, in the illustrated implementation, the second radio 414 is a 1×1 single input single output ("SISO") dual band Wi-Fi transceiver operable at the 2.4 GHz and 5 GHz bands. The second radio 414 includes an I/O that is communicatively coupled with the radio control arrangement 411 by way of communication paths 471 and 473. The second radio 414 may be operable at frequencies compliant with one or more IEEE 802.11 standards. In the illustrated implementation, for example, the second radio 414 is selectably operable at either the 2.4 GHz or the 5 GHz frequency band.

In the illustrated implementation, the first radio 412 and the second radio 414 are coupled with radio control arrangement 411 by way of, respectively, control signal paths 462 and 464. Further, the radio control arrangement 411 includes a software module and a hardware module. In the illustrated implementation, the hardware module includes a first switch 481 and a second switch 483. The first switch 481 and the second switch 483 are coupled with the software module by way of, respectively, control signals 461 and 463. The software module of radio control arrangement 411 may control the first switch 481 and the second switch 483 as described below. Moreover, the software module of the radio control arrangement 411 may configure the first radio 412 and the second radio by way of, respectively, control signals 462 and 464.

As a result, the radio controller 411 is operable to configure communication links, by way of a second antenna 416b, with the access point 130 (not illustrated) and second electronic device 150 (not illustrated) by appropriate commanding of the first radio 412, the second radio 414, the first switch 481 and the second switch 483. For example, the communication links may be configured in accordance with various Wi-Fi and Bluetooth (BT) standards as illustrated in the table below.

| $1^{st}$ Switch 481 | $2^{nd}$ Switch 483 | Network Link | Peer-to-Peer Link | |
|---|---|---|---|---|
| | | | $1^{st}$ Radio 412 | $2^{nd}$ Radio 414 |
| $1^{st}$ Radio 412 | $1^{st}$ Radio 412 | 5 GHz | 2.4 Ghz (BT) | NA |
| $2^{nd}$ Radio 414 | $1^{st}$ Radio 412 | 2.4 GHz | 2.4 Ghz (BT) | 5 Ghz |
| $1^{st}$ Radio 412 | $2^{nd}$ Radio 414 | 5 Ghz | NA | 2.4 GHz |
| $2^{nd}$ Radio 414 | $1^{st}$ Radio 412 | 2.4 GHz | NA | 5 GHz |

Although the table above illustrates a single peer-to-peer link, it will be appreciated that the radio controller 411 may be configured to establish separate peer-to-peer links with two or more remote electronic devices. For example, a first peer-to-peer link compliant with a Wi-Fi standard may be established with second electronic device 150 while additional peer-to-peer links may be established with other remote electronic devices by way of a Bluetooth connection.

As indicated above, in connection with FIG. 3 and FIG. 4, the presently disclosed techniques contemplate a radio control arrangement that is at least partially implemented in software and that is operable to dynamically and automatically establish mutually non-interfering, simultaneously operating, communication links between devices in a wireless LAN. More particularly, in some implementations, the communication links couple a first electronic device with (i) a network access point and (ii) a peer electronic device. Referring still to FIG. 4, the above functionality may be provided by electronic device 410 as a result of the software module of radio control arrangement 411 executing the process 200 described hereinabove in connection with FIG. 2.

More particularly, using the particular hardware implementation illustrated in FIG. 4 as an example, the radio control arrangement 411 may control a first scanning operation, block 201, with the objective of detecting a signal from an access point. For purposes of the present example it will be assumed that the first scanning operation is performed using the first radio 412 operating within the 2.4 GHz band.

If a determination is made, at block 202, that a signal from the access point has been detected, a network communication link in the 2.4 GHz band may be established, block 203, between the first radio 412 and the access point. Process 200 may then continue at block 240, as described hereinbelow.

On the other hand, if a determination is made, at block 202, that a signal from the access point has not been detected, the radio control arrangement 411 may control a second scanning operation, block 205. For purposes of the present example, it will be assumed that the second scanning operation is performed using the second radio 414 operating within the 5 GHz band. To accomplish this, the second radio 414 is coupled with the second antenna 416b. More particularly, the radio control arrangement 411 may actuate switch 481, such that it connects the second antenna 416b by way of the communication path 471 to the 5 GHz Wi-Fi 3 output of the second radio 414.

If a determination is made, at block 206, that a signal from the access point has not been detected, a determination may be made at block 207 whether or not to repeat the process 200.

If a determination is made, at block 206, that a signal from the access point has been detected, a network communication link in the 5 GHz band may be established, block 203, between the second radio 414 and the access point. For clarity of example, the first scanning operation 201 and the second scanning operation 205 have been described as separate sequential steps. It should be appreciated, however, in some implementations first scanning operation 201 and second scanning operation 205 may overlap or occur substantially simultaneously. For example, the first radio 412 may perform the first scanning operation 201 at a frequency within one of the 2.4 GHz and 5 GHz bands, while the second radio 414 performs the second scanning operation 205 at the other of the 2.4 GHz and 5 GHz bands.

Process 200 may establish the peer-to-peer communication link at block 240, which will now be described with particular reference to the hardware implementation illustrated in FIG. 4. At block 241, the radio control arrangement 411 may, with the objective of detecting a signal from a peer device, cause one or both of the first radio 412 and the second radio 414 to perform a scanning operation. The scanning operation at block 241 may be performed at a Wi-Fi frequency in a band different than the network communication link and/or in accordance with the Bluetooth standard. In the illustrated implementation, scanning for a Bluetooth compatible peer is performed by a first radio 412 using the first antenna 416a. The scanning operation in a Wi-Fi frequency may be performed by one or both of the first radio 412 using the first antenna 416a or the second antenna for 416a and the second radio 414 using the second antenna 416b.

If a signal from a peer is detected at block 242, the radio control arrangement 411 may establish the peer-to-peer link in a manner that is non-interfering with the network communication link. As a first example, where the network communication link is operating within the 5 GHz band, the first radio 412 may be used for both the network communication link and a Bluetooth peer-to-peer link. More particularly, in such case, the radio control arrangement 411 will establish the Bluetooth peer-to-peer link using the first radio 412, coupled by way of the communication path 472 with the first antenna 416a, and establish the network communication link using the first radio 412 and the second antenna 416a. To accomplish this, the radio control arrangement 411 may actuate the switch 481 so as to connect the second antenna 416b, by way of communication path 474, to the 5 GHz Wi-Fi 2 output of the first radio 412.

As a second example, where the network communication link is operating within the 2.4 GHz band, the first radio 412 may be used for both the network communication link and a first Bluetooth peer-to-peer link, while the second radio 414 may be used for a second peer-to-peer link within the 5 GHz band. More particularly, in such case, the radio control arrangement 411 will establish the Bluetooth peer-to-peer link using the first radio 412, coupled by way of the communication path 472 with the first antenna 416a, establish the network communication link within the 2.4 GHz band using the first radio 412 and the second antenna 416a, and establish a second peer-to-peer link within the 5 GHz band using the second radio 414 and the second antenna 416b. To accomplish this, the radio control arrangement 411 may actuate switch 483 so as to couple the second antenna 416b by way of the communication path 476 to the 2.4 GHz Wi-Fi output of the first radio 412 and may actuate switch 481 so as to connect the second antenna 416b, by way of the communication path 471 to the 5 GHz Wi-Fi 3 output of the second radio 414.

As a third example, where the network communication link is operating within the 5 GHz band, first radio 412 may be used for the network communication link while the second radio 414 may be used for a peer-to-peer link at 2.4 GHz. More particularly, in such case, the radio control arrangement 411 will establish the network communication link within the 5 GHz band using the first radio 412 and the second antenna 416b, and will establish the peer-to-peer link within the 2.4 GHz band using the second radio 414 and the second antenna 416b. To accomplish this, the radio control arrangement 411 may actuate switch 481 so as to couple the second antenna 416b by way of the communication path 474 to the 5 GHz Wi-Fi 2 output of the first radio 412, and may actuate switch 483 so as to couple second antenna 416b by way of the communication path 473 to the 2.4 GHz Wi-Fi 3 output of the second radio 414.

As a fourth example, where the network communication link is operating within the 2.4 GHz band, first radio 412 may be used for the network communication link while the second radio 414 may be used for a peer-to-peer link at 5 GHz. More particularly, in such case, the radio control arrangement 411 will establish the network communication link within the 2.4 GHz band using the first radio 412 and the second antenna 416b, and will establish the peer-to-peer link within the 5 GHz band using the second radio 414 and the second antenna 416b. To accomplish this, the radio control arrangement 411 may actuate switch 483 so as to couple second antenna 416b by way of communication path 476 to the 2.4 GHz Wi-Fi output 2 of the first radio 412, and may actuate switch 481 so as to couple second antenna 416b by way of communication path 471 to the 5 GHz Wi-Fi 3 output of the second radio 414.

In the environment of a wireless LAN, communication link parameters are liable to change in an unpredictable and dynamic manner as a result of network devices joining and exiting the network. Moreover, where, as presently contemplated, one or more of the network devices are portable, communication link characteristics are subject to significant and dynamic changes as the network devices change physical location and/or as ambient radio frequency interference levels change. Accordingly, the presently disclosed techniques contemplate compensating for these changes by updating, in real time, the configuration of the communication links coupling the first electronic device with the network access point, and with the peer electronic device.

Figure 5:
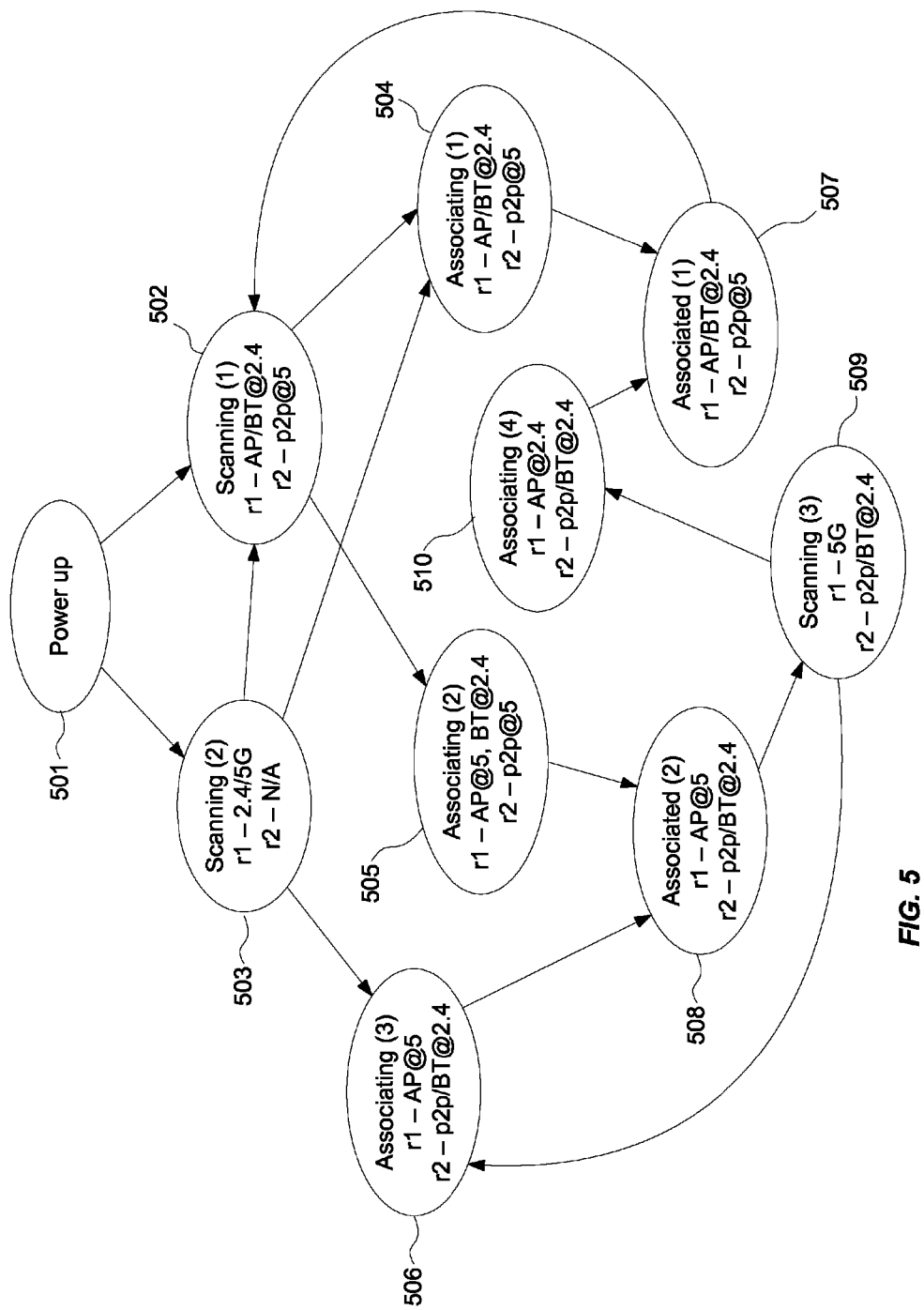
FIG. 5 illustrates a finite state machine diagram of a radio control arrangement according to a particular class of implementations.

A better understanding of the above-mentioned functionality of the radio control arrangement may be obtained by referring to FIG. 5 which illustrates a finite state machine diagram of the radio control arrangement according to an implementation. "Power up" state, block 501, relates to the state when the electronic device including the radio control arrangement boots up. The electronic device may be any type of mobile electronic device (e.g., an electronic book reader, a tablet computing device, a laptop computer, a smart phone, etc.) or any type of non-mobile electronic device (e.g., a desktop computer, a television, set-top box, stereo, digital media player, etc.) having a dual radio architecture such as described hereinabove in connection with FIG. 1 (first electronic device 110), FIG. 3 (electronic device 310) and FIG. 4 (electronic device 410), for example. In the illustrated implementation, if no access point has been previously configured (because, for example, the boot up is an out of the box event (DOBE), the radio control arrangement may proceed to "Scanning (1)" state, block 502, as described hereinbelow. On the other hand, if an access point has been previously configured the radio control arrangement may proceed to "Scanning (2)" state, block 503, as will also be described hereinbelow In the illustrated implementation, referring now to block 502, "Scanning (1)" state includes scanning for Wi-Fi access points in the 2.4 GHz frequency band with a first radio (r1), and in the 5 GHz frequency band with a second radio (r2). In some implementations, the radio control arrangement may collect results from both scans and, based on the scan results, make a determination whether to enter "Associating (1)" state, block 504, or "Associating (2)" state, block 505, which are described hereinbelow. In the illustrated implementation, the radio control arrangement will enter "Associating (1)" state, block 504, when the access point is found in the 2.4 GHz frequency band. When the access point is found in the 5 GHz frequency band, the radio control arrangement will enter "Associating (2)" state, block 505.

In the illustrated implementation, referring now to block 503, "Scanning (2)" state includes scanning for Wi-Fi access points in both the 2.4 GHz band and the 5 GHz frequency band using first radio r1. In the event that the scan is unsuccessful, meaning that no access point is found, the radio control arrangement may enter "Scanning (1)" state, block 502, described hereinabove. On the other hand, if an access point is found, the radio control arrangement may make a determination whether to enter "Associating (1)" state, block 504, or "Associating (3)" state, block 506, which will be described hereinbelow. In the illustrated implementation, the radio control arrangement will enter "Associating (1)" state, block 504, when the access point is found in the 2.4 GHz frequency band. When the access point has been found in the 5 GHz frequency band, the radio control arrangement will enter "Associating (3)" state, block 506.

In the illustrated implementation, referring now to block 504, "Associating (1)" state includes connecting to the access point at the 2.4 GHz frequency band using the first radio r1. Concurrently, the radio control arrangement may initiate a Bluetooth functionality in the first radio r1 at the 2.4 GHz frequency band, and configure second radio r2 to complete a peer-to-peer communications link at the 5 GHz frequency band. When the above-mentioned tasks have been accomplished the radio control arrangement may enter "Associated (1)" state, block 507, described hereinbelow.

In the illustrated implementation, referring now to block 505, "Associating (2)" state includes connecting to the access point at the 5 GHz frequency band using the first radio r1. This step may be preceded by ensuring that a Wi-Fi credential input by a user is correct. This is verification may be performed via second radio r2. When the above-mentioned tasks have been accomplished the radio control arrangement will enter "Associated (2)" state, block 508, described hereinbelow.

In the illustrated implementation, referring now to block 506, "Associating (3)" state includes connecting to the access point at the 5 GHz frequency band using the first radio r1. Concurrently, the radio control arrangement may configure second radio r2 to complete a peer-to-peer Wi-Fi communications link at the 2.4 GHz frequency band and initiate a Bluetooth functionality in the second radio r2 at the 2.4 GHz frequency band. When the above-mentioned tasks have been accomplished the radio control arrangement will enter "Associated (2)" state, block 508, described hereinbelow.

In the illustrated implementation, referring now to block 507, "Associated (1)" state includes maintaining a network communication link to the access point and a Bluetooth functionality at the 2.4 GHz frequency band using the first radio r1. The "Associated (1)" state further includes simultaneously maintaining a peer-to-peer communications link using second radio r2 at the 5 GHz frequency band. The "Associated (1)" state may be maintained for an indefinite period of time. In the event connectivity with the access point is lost, however, the radio control arrangement may return to the "Scanning (1)" state, block 502, described hereinabove.

In the illustrated implementation, referring now to block 508, "Associated (2)" state includes maintaining a network communication link to the access point at the 5 GHz frequency band using the first radio r1. The "Associated (1)" state further includes simultaneously maintaining a peer-to-peer communications link and a Bluetooth functionality using second radio r2 at the 2.4 GHz frequency band. The "Associated (2)" state may be maintained for an indefinite period of time. In the event connectivity with the access point is lost, however, the radio control arrangement may proceed to the "Scanning (3)" state, block 509, described hereinbelow.

In the illustrated implementation, referring now to block 509, "Scanning (3)" state includes scanning for Wi-Fi access points in the 5 GHz frequency band with the first radio r1, while scanning for Wi-Fi access points in the 2.4 GHz frequency band with the second radio r2. In some implementations, the radio control arrangement may collect results from both scans and, based on the scan results, make a determination whether to enter "Associating (3)" state, block 506, described hereinabove, or "Associating (4)" state, block 510, which described herein below. In the illustrated implementation, the radio control arrangement will enter "Associating (3)" state, block 506, when the access point is found in the 5 GHz frequency band. When the access point is found in the 2.4 GHz frequency band, the radio control arrangement will enter "Associating (4)" state, block 510.

In the illustrated implementation, referring now to block 510, "Associating (4)" state includes connecting to the access point at the 2.4 GHz frequency band using the first radio r1. Concurrently, the radio control arrangement may configure the second radio r2 to complete a peer-to-peer Wi-Fi communications link at the 2.4 GHz frequency band and initiate a Bluetooth functionality in the second radio r2 at the 2.4 GHz frequency band. When the above-mentioned tasks have been accomplished the radio control arrangement will enter "Associated (1)" state, block 507, described hereinabove.

As a result of the above disclosed techniques, simultaneous operation of a network communication link and a peer-to-peer communication link may be accomplished without recourse to time domain multiplexing and without regard to whether there is substantial isolation between two or more antennas associated with radios r1 and r2. Moreover, the disclosed techniques largely obviate a need spatial isolation or shielding between the antennas.

Figure 6:
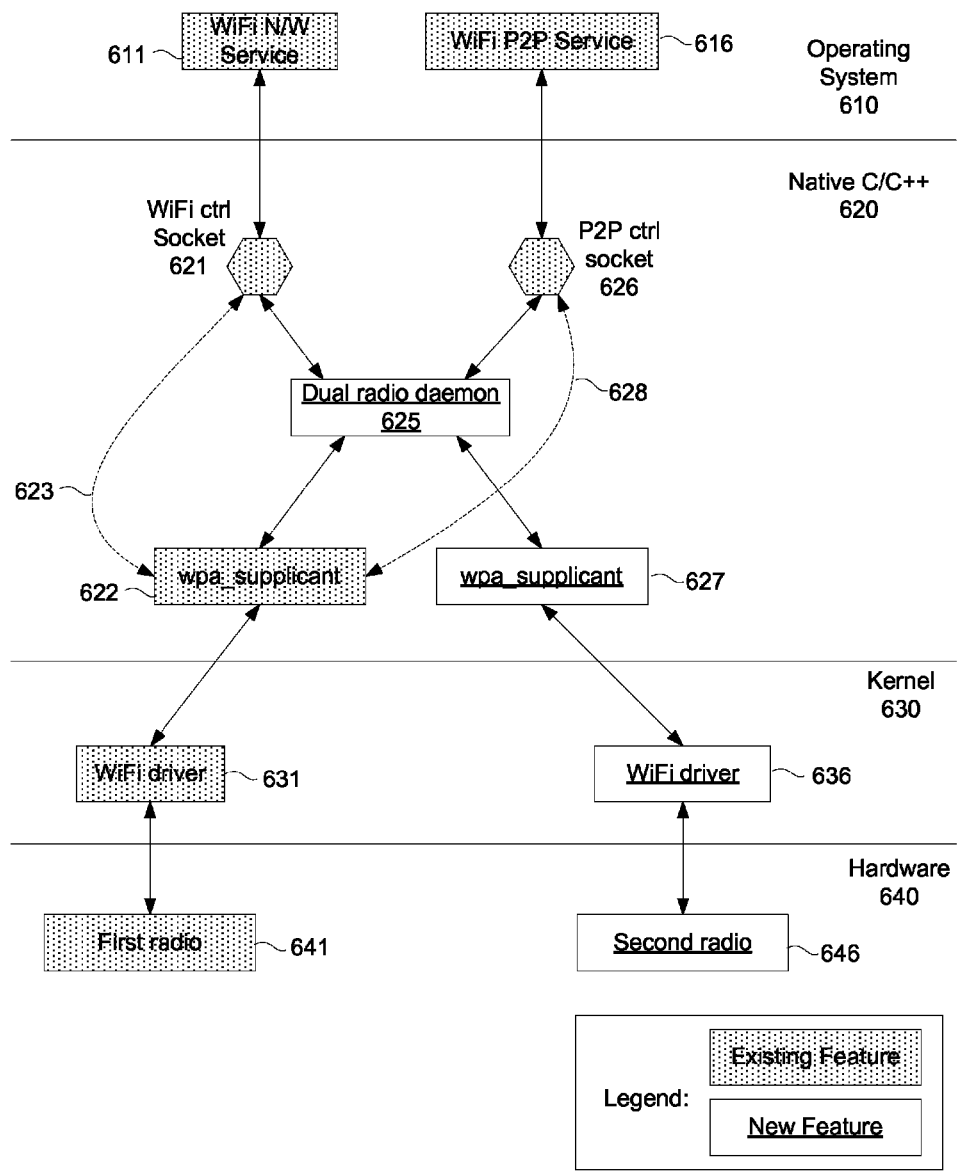
FIG. 6 illustrates a hardware/software suite of an electronic device, depicted in a simplified abstraction layer format, according to a particular class of implementations.

It will be appreciated that the presently disclosed techniques may be used in connection with industry standard wireless LAN and WPAN communication protocols and a hardware and software infrastructure that is compliant with such protocols. In some implementations, accordingly, the disclosed techniques may be realized as an overlay onto an existing hardware/software suite. A better understanding of the above mentioned feature may be obtained by referring now to FIG. 6, which illustrates an overlay of the presently disclosed techniques within a typical existing hardware/software suite, depicted in a simplified abstraction layer format. The typical existing hardware/software suite includes an operating system layer, 610, that includes Wi-Fi network service module 611 and Wi-Fi peer-to-peer service module 616, respectively. The operating system 610 may be an Android operating system, for example. A native C/C++ layer 620, operating below the operating system layer 610, includes a Wi-Fi control socket 621 and a peer-to-peer control socket 626, which interface respectively with the Wi-Fi network service module 611 and the Wi-Fi peer-to-peer service module 616. A kernel layer 630 includes a Wi-Fi driver 631 which interfaces with a first radio 641 within a hardware layer 640. In the absence of the presently disclosed techniques, the native C/C++ layer 620 includes a single wpa_supplicant module 622 that interfaces with the Wi-Fi driver 631. The wpa_supplicant module 622 may conform with the IEEE 802.1X/Wi-Fi Protected Access (WPA) standard and be responsible for negotiation with a WPA authenticator. The wpa_supplicant module 622 also interfaces directly with the Wi-Fi control socket 621 and the peer-to-peer control socket 626 by way of, respectively, paths 623 and path 628.

In some implementations a dual radio daemon module 625 and a wpa_supplicant module 627 is added to the C/C++ 620 layer described above. The dual radio daemon module 625 may be configured to provide some or all of the functionality of the software module of the previously described radio control arrangement 311 or 411. More particularly, the dual radio daemon module 625 may be configured to enforce the state transitions described above in connection with FIG. 5. The dual radio daemon module 625 may be interposed between the (existing) Wi-Fi control socket 621 and the peer control socket 626, on the one hand, and the (existing) wpa_supplicant module 622 and the (new) wpa_supplicant module 627, on the other. The new wpa_supplicant module 627 may be substantially identical to the existing wpa_supplicant module 622, and may interface with a new Wi-Fi driver 636, which in turn interfaces with a (new) second radio 646.

It will be appreciated that the illustrated dual radio architecture may be configured to be substantially transparent to the operating system layer 610. Although a dual radio architecture has been illustrated and described, it will be appreciated that at three or more radios may be accommodated by the presently disclosed techniques.

Figure 7:
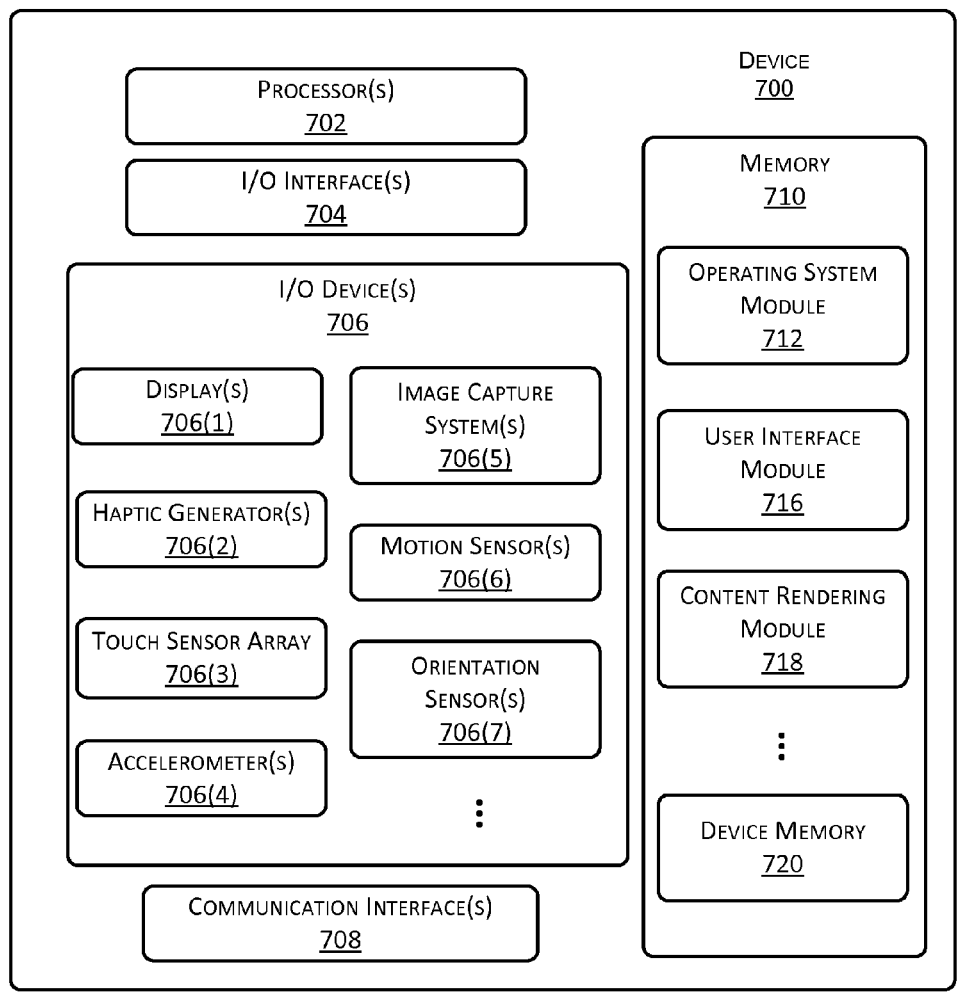
FIG. 7 illustrates a block diagram of an example of an electronic device with which the presently disclosed techniques may be employed.

FIG. 7 illustrates a block diagram of an example of an electronic device with which the presently disclosed techniques may be employed. Device 700 includes one or more single or multi-core processors 702 configured to execute stored instructions (e.g., in device memory 720). Device 700 may also include one or more input/output (I/O) interface(s) 704 to allow the device to communicate with other devices. I/O interfaces 704 may include, for example, an inter-integrated circuit (I2C) interface, a serial peripheral interface (SPI) bus, a universal serial bus (USB), an RS-232 interface, a media device interface, and so forth. I/O interface(s) 704 is coupled to one or more I/O devices 706. The I/O device(s) 706 may include one or more displays 706(1), one or more haptic generators 706(2), a touch sensor array 706(3), one or more accelerometers 706(4), one or more image capture systems 706(5), one or more motion sensors 706(6), one or more orientation sensors 706(7), microphones, speakers, and so forth. The one or more displays 706(1) are configured to provide visual output to the user and may comprise any of a variety of display types including, for example, any type of reflective or transmissive display. Touch sensor array 706(3) may be a capacitive sensor array having a matrix of conductors that are scanned to determine, for example, the location, duration, speed and direction of touch events within the matrix based on changes in electrical capacitance.

Device 700 may also include one or more communication interfaces 708 configured to provide communications between the device and other devices. Such communication interface(s) 708 may be used to connect to cellular networks, personal area networks (PANs), local area networks (LANs), wide area networks (WANs), and so forth. For example, communications interfaces 708 may include radio frequency modules for a 3G or 4G cellular network, a Wi-Fi LAN and a Bluetooth PAN. Device 700 also includes one or more buses or other internal communications hardware or software that allow for the transfer of data and instructions between the various modules and components of the device.

Device 700 may also include one or more memories (e.g., memory 710). Memory 710 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 710 provides storage for computer readable instructions, data structures, program modules and other data for the operation of device 700. Memory 710 may include at least one operating system (OS) module 712 configured to manage hardware resources such as I/O interfaces 704 and provide various services to applications or modules executing on processor(s) 702. Memory 710 may also include a user interface module 716, a content rendering module 718, and other modules.

User interface module 716 is configured to present a user interface to the user that may include visual, audible, and/or haptic components. For example, user interface module 716 may be configured to present, in conjunction with content rendering module 718, an image on display 706(1). User interface module 716 may also be configured to process inputs of applied forces (e.g., touch events, swipes, etc.) at particular locations on the display to take particular actions such as, for example, paging forward or backward through paged content, zooming in and out, panning, etc.

Memory 710 may also include device memory 720 to store a wide variety of instructions and information using any of a variety of formats including, for example, flat files, databases, linked lists, trees, or other data structures. In some implementations, a portion of device memory 720 may be distributed across one or more other devices including servers, network attached storage devices, and so forth.

The presently disclosed techniques may include computer program instructions to adaptively manage power draw from the battery of the peripheral device based on a real-time situational awareness may be implemented in a variety of ways. For example, they could be part of the native display controller logic of device 700. Alternatively, they could be implemented as a separate application that may be downloaded to the device. In another alternative, where device 700 is a thin client, at least some of the instructions may be hosted on a remote platform. It will also be understood that device 700 of FIG. 7 is merely an example of a device with which various implementations of the present invention may be practiced, and that a wide variety of other devices types may also be used. The scope of the invention should therefore not be limited by reference to device-specific details discussed above.

Examples of some of these implementations are illustrated in the accompanying drawings, and specific details are set forth in order to provide a thorough understanding thereof. It should be noted that implementations may be practiced without some of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. An electronic device, comprising:
   a first radio;
   a second radio;
   a first antenna coupled to the first radio;
   a second antenna; and
   a radio control arrangement circuit coupled to the second antenna, the first radio and the second radio, wherein the radio control arrangement circuit comprises:
      a first switch coupled to the second antenna, the first radio, and the second radio, a second switch coupled to the second antenna, the first radio, and the second radio;
      and further wherein the first switch is operable to route RF energy to the second antenna from either the first radio or the second radio, and the second switch is operable to route RF energy to the second antenna from either the first radio or the second radio; and
   the electronic device being configured to:
      establish a first wireless communication link, corresponding to a first communication standard to communicate with a first remote device at a first frequency band by coupling the first radio with the second antenna using the radio control arrangement circuit;
      select a second frequency band for use by the second radio, wherein the second frequency band is different from the first frequency band; and
      establish a second wireless communication link corresponding to the first communication standard to communicate with a second remote device at the second frequency band by coupling the second radio with the second antenna using the radio control arrangement circuit;
      wherein the radio control arrangement circuit is configured to couple the first and second radios to the second antenna such that the first wireless communication link and the second wireless communication link simultaneously transmit packets via the second antenna at the first frequency band and the second frequency band such that a transmitted packet associated with the first wireless communication link overlaps in time with a transmitted packet associated with the second wireless communication link.

2. The electronic device of claim 1, wherein:
   the first frequency is about 2.4 GHz and the second frequency is about 5 GHz; or the second frequency is about 2.4 GHz and the first frequency is about 5 GHz.

3. The electronic device of claim 1, wherein the first frequency and the second frequency are both compliant with a wireless local area network (WLAN) standard.

4. The electronic device of claim 1, wherein the first electronic device establishes a third wireless communication link with a third remote device, the third wireless communication link being compliant with a wireless personal area network (WPAN) standard.

5. The electronic device of claim 1, wherein the first frequency is compliant with a wireless local area network (WLAN) standard and the second frequency is compliant with a wireless personal area network (WPAN) standard.

6. The electronic device of claim 1, wherein the first radio is compatible with a first wireless local area network (WLAN) standard and the second radio is compatible with a second WLAN standard.

7. The electronic device of claim 1, wherein the first radio is compatible with a wireless local area network (WLAN) standard and the second radio is compatible with a wireless personal area network (WPAN) standard.

8. The electronic device of claim 1, wherein each of the first radio and the second radio are compatible with at least two wireless local area network (WLAN) standards, and one or both of the first radio and the second radio are compatible with at least one wireless personal area network (WPAN) standard.

9. The electronic device of claim 8, wherein the electronic device is further configured to:
   establish a third wireless communication link with a third remote device at the first frequency using the first radio, the third wireless communication link being compatible with the WPAN standard.

10. A method comprising:
   performing, by an electronic device having a first antenna and a second antenna, using a first radio, a first scanning operation, to detect a signal from a first remote device;
   establishing, by the electronic device, a first wireless communication link, corresponding to a first communication standard, with the first remote device at a first frequency band, using the first radio, a radio control arrangement circuit, and the second antenna;
   establishing, by the electronic device, a second wireless communication link, corresponding to the first communication standard, with a second remote device at a second frequency band, using a second radio, the radio control arrangement circuit, and the second antenna, wherein the second frequency band is different from the first frequency band; and
   wherein the radio control arrangement circuit comprises:
      a first switch coupled to the second antenna, the first radio, and the second radio, a second switch coupled to the second antenna, the first radio, and the second radio;
      and further wherein the first switch is operable to route RF energy to the second antenna from either the first radio or the second radio, and the second switch is operable to route RF energy to the second antenna from either the first radio or the second radio; and wherein the first wireless communication link and the second wireless communication link simultaneously transmit packets via the second antenna at the first frequency band and the second frequency band such that a transmitted packet associated with the first wireless communication link overlaps in time with a transmitted packet associated with the second wireless communication link.

11. The method of claim 10, wherein both the first and the second frequencies are compliant with a wireless local area network (WLAN) standard.

12. The method of claim 10, wherein the first frequency is compliant with a wireless local area network (WLAN) standard and the second frequency is compliant with a wireless personal area network (WPAN) standard.

13. The method of claim 10, further comprising:
establishing, by the electronic device, a third wireless communication link with a third remote device, the third wireless communication link being compliant with a wireless personal area network (WPAN) standard.

14. The method of claim 10, wherein the first wireless communication link is compatible with a wireless local area network standard, the method further comprising:
establishing, by the electronic device, a third wireless communication link at the first frequency, using the first radio, the third wireless communication link being compatible with a wireless personal area network (WPAN) standard.

15. The method of claim 10, wherein the first frequency is about 2.4 GHz and the second frequency is about 5 GHz.

16. The method of claim 10, wherein the first frequency is about 5 GHz and the second frequency is about 2.4 GHz.

17. An electronic device, comprising:
a first radio frequency (RF) input/output (I/O);
a second RF I/O;
a first antenna;
a hardware module comprising:
a first switch coupled to the first antenna, the first RF I/O, and the second RF I/O, a second switch coupled to the first antenna, the first RF I/O, and the second RF I/O;
wherein the first switch is operable to route RF energy to the first antenna from either the first RF I/O or the second RF I/O, and the second switch is operable to route RF energy to the first antenna from either the first RF I/O or the second RF I/O; and a software module operable to configure the hardware module to selectively operate in supported modes including:
simultaneously transmitting using 1) via the first antenna, the first RF I/O using a network link at a first frequency band using a first wireless communication standard and 2) via the first antenna, the second RF I/O using a peer to peer link at a second frequency band using the first wireless communication standard,
simultaneously transmitting using 1) via the first antenna, the first RF I/O using a network link at the second frequency band using the first wireless communication standard and 2) via the first antenna, the second RF I/O using a peer to peer link at the first frequency band using the first wireless communication standard.

18. The electronic device of claim 17, further comprising:
a third RF I/O;
a second antenna; and
further wherein the supported modes further include:
simultaneously transmitting using 1) via the first antenna, the first RF I/O using a network link at a first frequency band using a first wireless communication standard, 2) via the first antenna, the second RF I/O using a peer to peer link at a second frequency band using the first wireless communication standard, and 3) via the second antenna, the third RF I/O using a peer to peer link at the first frequency band using a second wireless communication standard.

19. The electronic device of claim 18, wherein the first wireless communication standard is compliant with a wireless local area network (WLAN) standard, and the second wireless communication standard is compliant with a wireless personal area network (WPAN) standard.

20. The electronic device of claim 19, wherein the first frequency band is about 2.4 GHz and the second frequency band is about 5 GHz, or the first frequency band is about 5 GHz and the second frequency band is about 2.4 GHz.

* * * * *